(12) United States Patent
Bate

(10) Patent No.: US 12,397,900 B2
(45) Date of Patent: Aug. 26, 2025

(54) MOVEABLE WING TIP ARRANGEMENTS

(71) Applicant: Airbus Operations Limited, Bristol (GB)

(72) Inventor: Christopher Alan Bate, Bristol (GB)

(73) Assignee: Airbus Operations Limited, Bristol (GB)

( * ) Notice: Subject to any disclaimer, the term of this patent is extended or adjusted under 35 U.S.C. 154(b) by 99 days.

(21) Appl. No.: 18/066,502

(22) Filed: Dec. 15, 2022

(65) Prior Publication Data

US 2023/0192271 A1    Jun. 22, 2023

(30) Foreign Application Priority Data

Dec. 16, 2021    (GB) ..................................... 2118253

(51) Int. Cl.
*B64C 3/56*    (2006.01)
*B64C 23/06*    (2006.01)

(52) U.S. Cl.
CPC .............. *B64C 3/56* (2013.01); *B64C 23/072* (2017.05)

(58) Field of Classification Search
CPC ............ B64C 3/56; B64C 3/48; B64C 23/072
See application file for complete search history.

(56) References Cited

U.S. PATENT DOCUMENTS

| 4,049,219 | A | * | 9/1977 | Dean | ......................... B64C 9/20 |
| | | | | | 244/217 |
| 5,381,986 | A | | 1/1995 | Smith et al. | |
| 2014/0117151 | A1 | * | 5/2014 | Fox | ........................... B64C 3/56 |
| | | | | | 244/49 |
| 2017/0137112 | A1 | * | 5/2017 | Winkelmann | ............. B64C 3/56 |

FOREIGN PATENT DOCUMENTS

| BR | 112018009344 A2 * 11/2018 | ............... B64C 1/36 |
| WO | WO 2019/034432 A1   2/2019 | |

OTHER PUBLICATIONS

British Search Report for Application No. 2118253 dated Jun. 15, 2022.

* cited by examiner

*Primary Examiner* — Timothy D Collins
*Assistant Examiner* — Eric Acosta
(74) *Attorney, Agent, or Firm* — KDW Firm PLLC

(57) ABSTRACT

A wing assembly for an aircraft has a wing, a moveable wing tip device and an actuation assembly to move the wing tip device. The actuation assembly is disposed externally of the wing assembly. In a further aspect, the actuation assembly has a first connector member connected externally of the wing assembly at the actuator and pivotably connected at a lower portion of the wing or wing tip. This can facilitate the provision of effective internal supporting structure for transferring flight loads across the interface of the wing and wing tip device, especially in wing assemblies having a high aspect ratio. In a still further aspect, the wing assembly has a seal extending chordwise within the wing assembly, for resisting passage of air through an interface region between the wing and the wing tip device.

22 Claims, 14 Drawing Sheets

MOVEABLE WING TIP ARRANGEMENTS

TECHNICAL FIELD

The disclosure herein relates to wing assemblies for aircraft having moveable wing tip devices, actuation assemblies for such wing assemblies, and aircraft comprising such assemblies.

BACKGROUND

The maximum aircraft wing span for passenger aircraft often is effectively limited by airport operating rules which govern various clearances required when manoeuvring around the airport (such as the span and/or ground clearance required for gate entry and safe taxiway usage).

In some suggested designs, aircraft are provided with wing tip devices which may be moved to reduce the span of the aircraft on the ground (compared to when the aircraft is configured for flight). As wing spans continue to increase, the spanwise extent of wing tip devices relative to the inboard wing grows proportionally greater. However, there are technical challenges in providing a practical form of moving arrangement. Amongst the issues to be addressed is the problem of providing a reliable moving mechanism for accommodating the inboard and outboard movement of the wing tip device without impacting unduly on the design of the wing assembly.

SUMMARY

The inventor has identified that, with the tendency for wing aspect ratios to increase and wing box thicknesses to decrease, further constraints to wing design are emerging regarding, for example, how and where to efficiently accommodate i) joints for reacting increasingly large flight loads transmitted between the moveable wing tip device and the inboard wing of a wing assembly and/or ii) increasingly large and/or heavy components for driving the folding and unfolding of the wing tip device, and furthermore how to achieve i) and/or ii) while maintaining satisfactory aerodynamic sealing between upper and lower surfaces of the wing assembly. Aspects of the disclosure herein seek to mitigate or overcome at least some of the above-mentioned problems.

According to a first aspect of the disclosure herein, there is provided the wing assembly comprising a wing, a moveable wing tip device at the tip of the wing, and an actuation assembly configured to move the wing tip device between:

a flight configuration for use during flight, in which the wing tip device projects from the wing for increasing the span of the aircraft, and a ground configuration for use during ground-based operations, in which ground configuration the wing tip device is moved away from the flight configuration for reducing the span of the aircraft, the actuation assembly comprising an actuator and a connector arrangement connecting the actuator to the wing assembly for driving movement of the wing tip device relative to the wing;

wherein the actuation assembly is disposed externally of the wing assembly.

Such an arrangement facilitates the mitigation or overcoming of potential problems in facilitating movement of a moveable wing tip device while providing suitable supporting structure for transferring flight loads across the interface of the wing and wing tip device. Disposing the actuation assembly or key parts thereof externally of the wing assembly can free up space inside the wing assembly, facilitating the provision of an increased number and/or size of hinge joints and/or latch arrangements to transfer flight loads at locations chordwise along the interface of the wing and the wing tip device, which locations can be more closely and/or regularly spaced. This mitigates load peaking associated with concentrated groups of lugs, and enables increased flight loads to be accommodated by distributing the transfer of such loads across suitably sized hinge joints and latch arrangements disposed at suitably spaced load transfer locations along the interface, in a manner less constrained by internally located components of the actuation assembly for moving the wing tip device. Therefore, the provision of an external actuation assembly as described herein facilitates the provision of longer moveable wing tip devices and/or longer span wing assemblies, especially when used with high aspect ratio wings with low thickness to chord ratios and shallow wing boxes, which can result in wing assemblies with reduced overall drag, and aircraft with increased fuel efficiency, reduced emissions and/or reduced operating costs. Such an arrangement also facilitates the favourable positioning of the actuation assembly in order to obtain mechanical advantage when applying force to the wing tip device, and therefore facilitates the use of a smaller and/or lighter actuator. Furthermore, such an arrangement facilitates improved access to the actuation assembly, for example for maintenance or replacement purposes, without requiring specialist ground support equipment for moving the wing tip device, or requiring the dismantling of wing sections to access inside of the wing. Still further, greater available space inside the wing assembly facilitates the provision of an effective seal arrangement within the wing assembly for resisting passage of air through an interface region between the wing and the wing tip device, to mitigate aerodynamic leakage and consequential performance degradation of the wing assembly.

Preferably, a fairing is provided to reduce aerodynamic inefficiencies caused by protrusion of the actuation assembly beneath the wing assembly. Such a fairing facilitates an overall improvement in aerodynamic performance when combined with a more aerodynamically efficient wing assembly. In some examples, the fairing can conveniently be attached to moving parts of the actuation assembly, so as to be movably driven by the actuation assembly as the wing assembly moves in and out of the ground configuration.

WO2019/034432 discloses a geared actuation unit for folding upwards a wing tip portion relative to a fixed wing. The actuation unit is positioned in the wing on a main axis of rotation of the wing tip portion, intervening between two neighboring hinge joints. U.S. Pat. No. 5,381,986 discloses a fold actuator located within the wing. Use of geared rotary actuators and linear actuators between hinge points inside deep wing boxes, for folding short wings in combat aircraft, is also known.

Preferably, the connector arrangement comprises: a first connector member having a first portion pivotably connected at the actuator, and a second portion pivotably connected at a lower portion of the wing or wing tip device; and a second connector member interconnected between the actuator and the other of the wing or the wing tip device.

The second connector member, in a preferred embodiment, has a first portion fixedly connected at a body of the actuator and a second portion pivotably connected at a lower portion of the other of the wing or the wing tip device. With such an arrangement, the actuator moves upwards as the wing tip device is raised into the ground configuration, which facilitates the provision of a wing assembly having improved ground clearance in the ground configuration, with a reduced likelihood of impact from ground vehicles. In an alternative preferred embodiment, the second connector member comprises first and second portions respectively fixedly connected at a body of the actuator and at the other of the wing or the wing tip device.

Preferably, at least one of the connector arrangement and the actuator is disposed wholly externally of the lower covers of the wing and of the wing tip device in the flight configuration.

Preferably, the wing assembly comprises hinge joints arranged in a chordwise sequence along a hinge axis and pivotably interconnecting the wing and the wing tip device, and the sequence of hinge joints is not interrupted by the actuation assembly. In one preferred example, each hinge joint is arranged immediately adjacent to the or each neighboring hinge joint in the sequence. In this manner, flight loads can be distributed across an increased number of load transfer locations and/or along an increased proportion of the chordwise extent, for example substantially the entire chordwise extent, of the wing assembly at the interface of the wing and the wing tip device. In some preferred alternative examples, having similar advantages to those just described, the sequence of hinge joints is interrupted by at least one upper latch mechanism for transferring flight loads in the flight configuration, or a continuous hinge may be provided.

The wing assembly preferably further comprises lower latches arranged in a chordwise sequence and, in the flight configuration, interconnecting the wing and the wing tip device for transfer of flight loads therebetween, wherein the sequence of latches is not interrupted by any part of the actuation assembly. In some preferred examples, the wing assembly comprises a chordwise extending sequence of hinge joints disposed vertically above a chordwise extending sequence of lower latches inside the wing assembly, and the actuator is disposed vertically below at least some of the hinge joints and/or latches in the flight configuration.

Freeing up space inside the wing assembly provides fewer constraints on the vertical spacing between hinge joints and lower latches, facilitating provision of a longer vertical moment arm for better reacting flight loads about a chordwise axis, in addition to the aforementioned chordwise distribution of hinge points which facilitates the improved reacting of flight loads about a spanwise axis. In some preferred examples, horizontal latch lugs can be provided at the lower cover joint with vertical latch pins and latch pin actuators for actuating the pins, with the hinge joints provided at the upper cover vertically above the lower latch pins and latch lugs. In some preferred embodiments, the actuator and hinge joints are intersected by a common vertical plane Preferably, the wing and the wing tip device each have respective seal support surfaces that mutually interact in the flight configuration to provide an aerodynamic seal extending chordwise within the wing assembly, for resisting passage of air through an interface region between the wing and the wing tip device. Advantageously, in some examples the seal extends continuously between the front and rear spars of the wing assembly. The seal support surfaces preferably interact in the flight configuration to compress a compressible seal member therebetween.

The actuator is a preferably rotary actuator, for example a geared rotary actuator. Other types of actuator are also envisaged, for example linear actuators with suitable link mechanisms.

According to a second aspect of the disclosure herein, there is provided the wing assembly comprising a wing, a moveable wing tip device at the tip of the wing, and an actuation assembly configured to move the wing tip device between:
 a flight configuration for use during flight, in which the wing tip device projects from the wing for increasing the span of the aircraft, and
 a ground configuration for use during ground-based operations, in which ground configuration the wing tip device is moved away from the flight configuration for reducing the span of the aircraft,
the actuation assembly comprising an actuator and a connector arrangement connecting the actuator to the wing assembly for driving movement of the wing tip device relative to the wing;
wherein the connector arrangement comprises: a first connector member having a first portion connected at the actuator externally of the wing assembly and a second portion pivotably connected at a lower portion of the wing or wing tip device.

Connecting the first connector member to the actuator externally of the wing assembly facilitates the mitigation or overcoming of potential problems in facilitating movement of a moveable wing tip device, as described above. The first portion of the first connector is, in some preferred embodiments, fixedly connected to a segment of the actuator, which segment is rotatably drivable by the actuator relative to a body of the actuator so as to cause the first connector member to pivot relative to the actuator body.

Preferably, the connector arrangement further comprises a second connector member interconnected between the actuator and the other of the wing or the wing tip device. The second connector member, in a preferred embodiment, has a first portion fixedly connected at a body of the actuator and a second portion pivotably connected at a lower portion of the other of the wing or the wing tip device. In another preferred embodiment, the second connector member comprises first and second portions respectively fixedly connected at the actuator body and at the other of the wing or the wing tip device. Preferably, the second portion of the first connector is pivotably connected at lower covers of the wing tip device.

According to a third aspect of the disclosure herein, there is provided an actuation assembly configured to move a moveable wing tip device of a wing assembly, the actuation assembly comprising an actuator and a connector arrangement for connecting the actuator to the wing assembly for driving movement of the wing tip device relative to a wing of the wing assembly, the connector arrangement comprising: a first connector member having a first portion pivotably connectable to the actuator externally of the wing assembly and a second portion pivotably connectable to a lower portion of the wing or wing tip device; and a second connector member interconnectable between the actuator and the other of the wing or the wing tip device. In a preferred embodiment, the second connector member has a first portion fixedly connectable at a body of the actuator and a second portion pivotably connectable at a lower portion of the other of the wing or the wing tip device. In another preferred embodiment, the second connector member comprises first and second portions respectively fixedly connectable at a body of the actuator and at the other of the wing or the wing tip device.

According to a fourth aspect of the disclosure herein, there is provided a wing assembly for an aircraft, the wing assembly comprising a wing, a moveable wing tip device at the tip of the wing, and an actuation assembly configured to move the wing tip device between:

a flight configuration for use during flight, in which the wing tip device projects from the wing for increasing the span of the aircraft, and a ground configuration for use during ground-based operations, in which ground configuration the wing tip device is moved away from the flight configuration for reducing the span of the aircraft, wherein the wing and the wing tip device each having respective seal support surfaces that mutually interact in the flight configuration to provide an aerodynamic seal extending chordwise within the wing assembly, for resisting passage of air through an interface region between the wing and the wing tip device, the seal extending continuously between the front and rear spar of the wing assembly.

In this manner, improved aerodynamic sealing of the wing assembly is facilitated. Movements of the wing tip device may cause decompression and compression of the seal, and the provision of seal support surfaces that face in the direction of seal engagement or disengagement is facilitated. The seal support surfaces may be arranged normal, or close to normal, to the direction of seal engagement or disengagement along a major portion of the extent of the seal across the wing assembly in a chordwise direction. The seal may comprise a continuous seal member extending over the first seal support surface and/or the second seal support surface. Multiple seal support surfaces and/or seals may be provided in accordance with design requirements. The provision of a wing assembly having lower seal breakout forces, and/or a reduced likelihood of damage to the seal and wing assembly components, and/or reduced aerodynamic leakage and reduced consequential performance degradation is facilitated.

The wing tip device may be a wing tip extension; for example, the wing tip device may be a planar tip extension. In other embodiments, the wing tip device may comprise, or consist of, a non-planar device, such as a winglet. The wing tip device may comprise a further wing section having a further moveable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices.

In the flight configuration the trailing edge of the wing tip device may be a continuation of the trailing edge of the wing. The leading edge of the wing tip device may be a continuation of the leading edge of the wing, such that there is a smooth transition from the wing to the wing tip device. It will be appreciated that there may be a smooth transition, even where there are changes in sweep or twist at the wing/wing tip device junction. However, there are preferably no discontinuities at the junction between the wing and wing tip device. At least at the root of the wing tip device, and preferably along the length of the wing tip device, the upper and lower surfaces of the wing tip device may be continuations of the upper and lower surfaces of the wing. The span ratio of the wing relative to the wing tip device may be such that the wing comprises at least 70%, 80%, 90%, or more, of the overall span of the wing assembly. The wing may comprise a wing root fixedly mounted to an aircraft body. In alternative embodiments, the wing may be movably connected to an inboard further wing portion, the latter fixedly mounted to the aircraft body, providing a wing assembly with more than two relatively moveable sections.

According to a further aspect of the disclosure herein, there is provided an aircraft comprising a wing assembly and/or an actuator as described above.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration the wing tip device may be held in place. For example, the wing tip device may be latched or locked in place to prevent movement back towards the flight configuration.

The or each actuator may take any of a wide variety of forms and may for example be any suitable kind of gas, hydraulic or electric drive. Many alternative implementations of the actuation assembly will be apparent to the ordinarily skilled person.

The disclosure herein may be applied to a military aircraft and/or to a cargo aircraft, for example, but is especially advantageous in the case of a passenger aircraft. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the disclosure herein may be incorporated into other aspects of the disclosure herein. For example, features described in relation to the aircraft of the first aspect of the disclosure herein may be incorporated into the aircraft of the second aspect of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
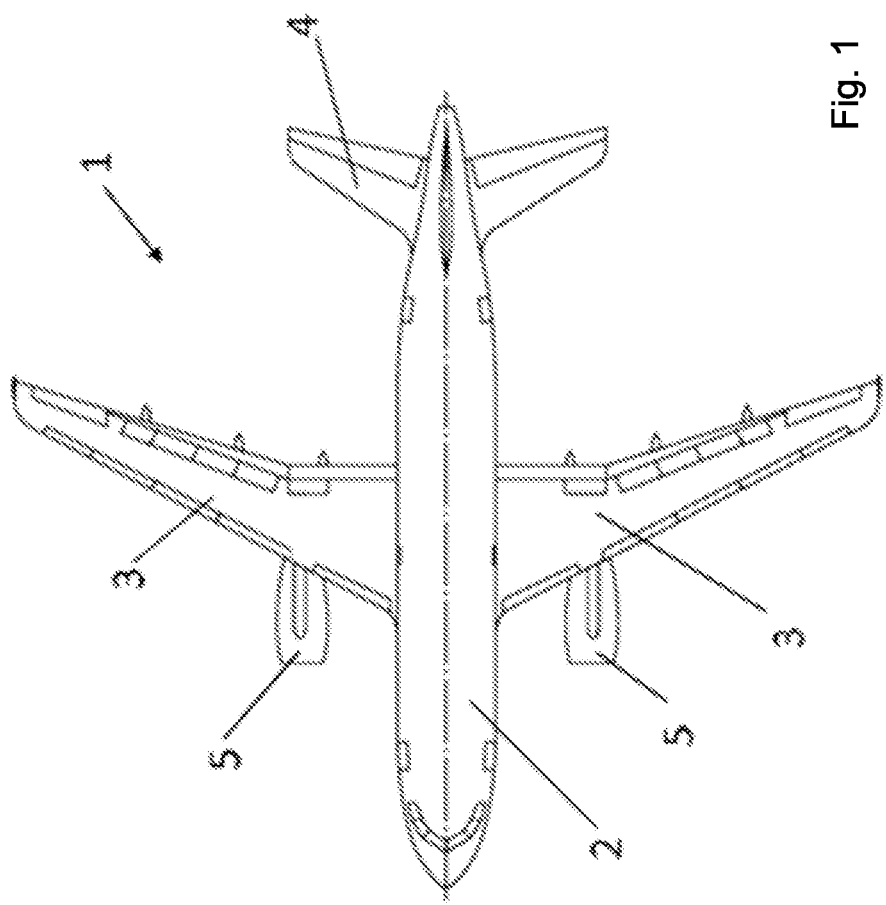
FIG. 1 is a top view of a passenger aircraft to which a wing tip device may be fitted.

FIG. 1 shows a passenger aircraft 1 having a fuselage 2, wings 3, a tailplane 4 and engines 5. The aircraft shown in FIG. 1 is a simply one example of an aircraft to which the disclosure herein may be applied by fitting wing tips. The wing tips may be retro-fitted or fitted during manufacture of the aircraft.

FIGS. 2 through 6 illustrate portions of a wing assembly in various configurations thereof. The wing assembly may, for example be a right hand one (as viewed looking forwards along the fuselage 2) of the wing assemblies 3 shown in FIG. 1. The wing assembly 3 has a wing 9, a wing tip device 6 for mounting at the tip of the wing 9 and an actuation assembly 200. The wing 9 is fixed at one end thereof (not shown) to the fuselage of an aircraft. In alternative embodiments (not shown), the wing may be movably mounted to the tip of a further wing.

Figure 3:
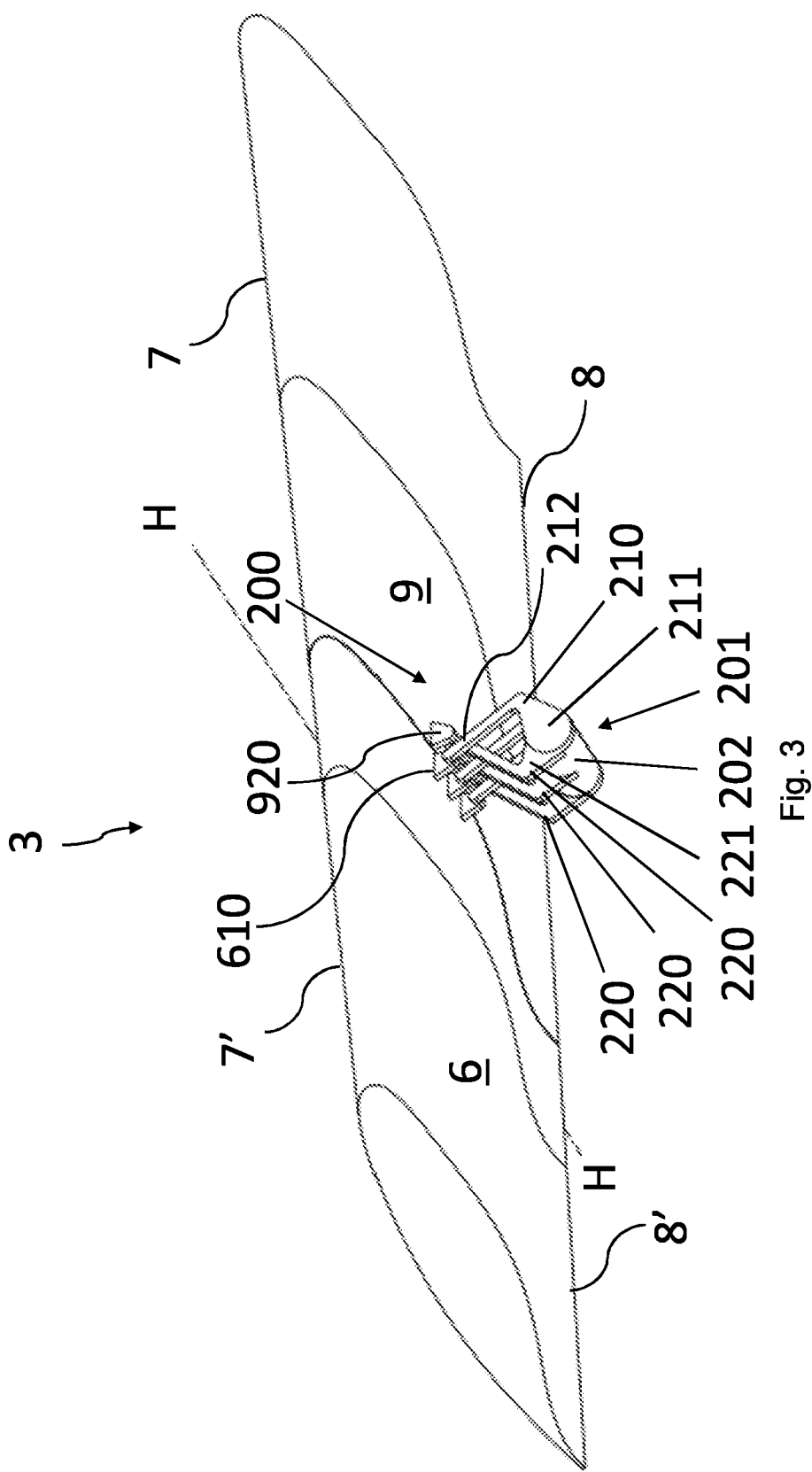
FIG. 3 is a perspective view of the wing assembly in the flight configuration.
Figure 4:
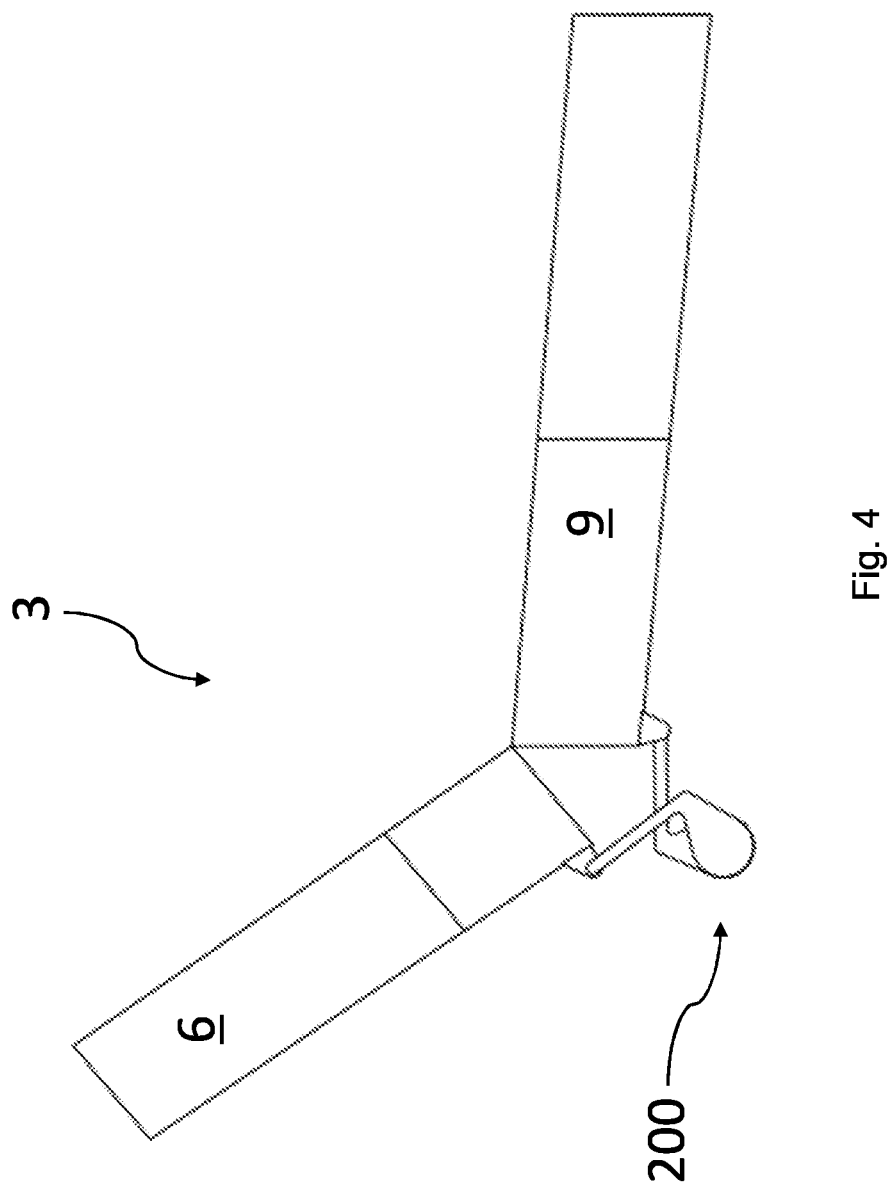
FIG. 4 is a front view of the wing assembly in an intermediate configuration.

The wing tip device 6 is moveable by the actuation assembly 200 to rotate about a chordwise extending hinge axis H-H between a flight configuration shown in FIGS. 2 and 3 and a ground configuration shown in FIGS. 5 and 6, as will be described in further detail below, through various intermediate configurations, one of which is shown in FIG. 4. In the flight configuration, the leading and trailing edges 7', 8' (see FIG. 3) of the wing tip device 6 are continuations of the leading and trailing edges 7, 8 (see FIG. 3) of the wing 9. Furthermore, the upper and lower surfaces of the wing tip device 6 are continuations of the upper and lower surfaces of the wing 9. Thus, there is a smooth transition from the wing 9 to the wing tip device 6.

The wing tip device 6 is placed in the flight configuration for flight. In the flight configuration, the wing tip device 6 increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage, and access to hangars for maintenance). Thus, in embodiments of the disclosure herein described below the wing tip device 6 is moveable to a ground configuration for use when on the ground. In the ground configuration the wing tip device 6 is displaced inwardly, from the above-mentioned flight configuration.

Changing the span of an aircraft is known per se. For example, in some suggested designs, combat aircraft are provided with wings which may be folded upwardly to reduce the span of the aircraft on the ground (compared to when the aircraft is configured for flight). However, such arrangements generally use actuators disposed within the wing to deploy the wing, and hinge arrangements disposed at locations to the front and rear of such actuators. This requires deep wing boxes to accommodate the actuators, and strong and/or heavy wing and hinge and/or latch components to handle force concentrations at the limited number of hinge and/or latch locations, for safely transferring flight loads generated at the foldable wing portion and securely holding the wing in the flight configuration.

Figure 2:
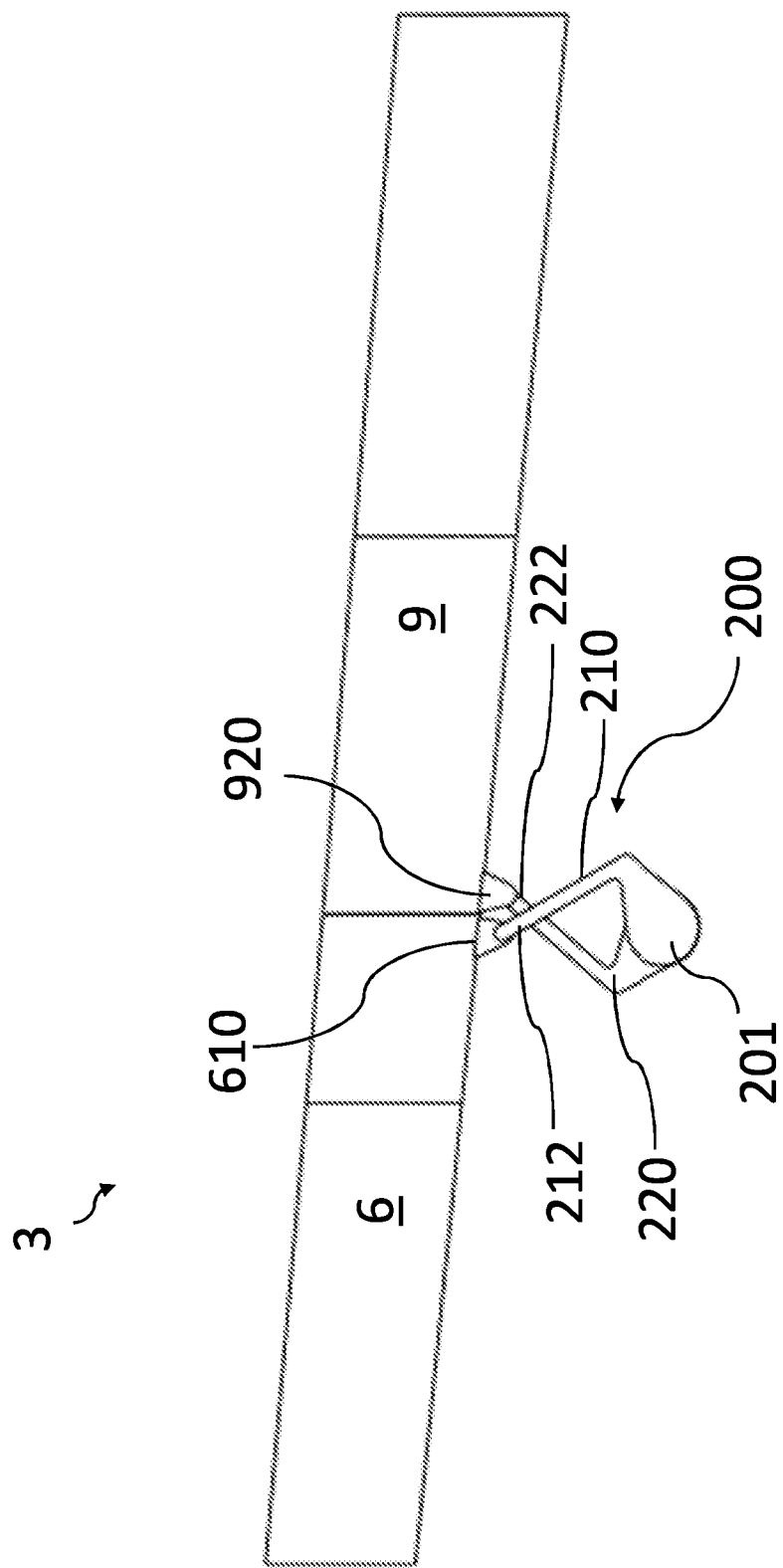
FIG. 2 is a front view of portions of a wing assembly in a flight configuration.

FIG. 2 is a schematic front view of the wing assembly 3 in the flight configuration. FIG. 3 is a perspective view of the wing assembly 3 of FIG. 2 from below and facing inboard. The actuation assembly 200 comprises at least one actuator 201, which in the example is a rotary actuator, and a connector arrangement connecting the actuator 201 to the wing assembly 3 for driving movement of the wing tip device 6 relative to the wing 9.

The connector arrangement comprises a first connector member 210 having a first portion 211 thereof connected at the actuator 201 and a second portion 212 thereof pivotably connected at a lower portion of the wing tip 6. In the example shown in FIGS. 2 through 6, the first connector member 210 comprises a rigid lever arm having at an end region thereof a transversely extending first end portion 211 fixedly mounted relative to a segment of the actuator 201. The segment is rotatably drivable by the actuator about an axis of rotation of the actuator 201 relative to a rigid body portion 202 of the actuator 201, so as to cause the first connector member 210 to pivot relative to the actuator body 202. The second portion 212 of the first connector member 210 lies at an opposite end of the rigid lever arm to the first portion 211, and is pivotably mounted to a pivot mount 610 fixed relative to a lower cover of the wing tip device 6. To move to a ground configuration, the second portion 212 is driven about the axis of rotation of the actuator 201 in an anti-clockwise direction as shown in FIG. 3, and imparts force to the lower cover of the wing tip device 6 in a direction having an upward component and an outboard component.

The connector arrangement further comprises a second connector member 220 interconnected between the actuator 201 and the wing 9. A first portion 221 of the second connector member 220 is connected at the actuator 201 and a second portion 222 of the second connector member 220 is pivotably connected at a lower portion of the wing 9. In the example shown in FIGS. 2 through 6, the second connector member 220 comprises a rigid lever arm having at an end region thereof a transversely extending first end portion 221 fixedly mounted relative to the body portion 202 of the actuator 201. The actuator body 202 is rotatable by the actuator about the axis of rotation of the actuator 201 relative to the aforementioned rotatable segment of the actuator 201. The second portion 222 of the second connector member 220 lies at an opposite end of the rigid lever arm to the first portion 221, and is pivotably mounted to a pivot mount 920 fixed relative to the lower cover of the wing 9. To move to a ground configuration, the second end portion 222 of the second connector member 220 is driven about the axis of rotation of the actuator 201 in a clockwise direction as shown in FIG. 3, and imparts force to the lower cover of the wing 9 in a direction having an upward component and an inboard component.

In the embodiment shown in FIGS. 2 through 6, the connector arrangement comprises a chordwise extending sequence of three first connector members 210 interconnecting respective rotatably drivable segments of the actuator 201 and respective pivot mounts 610 of the wing tip device 6. The first connector members 210 are interleaved along the axis of the actuator 201 with a corresponding axially extending sequence of three second connector members 220 respectively interconnecting the actuator body 202 and respective pivot mounts 920 of the wing 9. In alternative embodiments, the connector arrangement may comprise any suitable alternative number of first and/or second connector members 210, 220, according to design requirements. The wing assembly 3 may comprise more than one actuator assembly 200.

Various arrangements of hinge joints, latches and seal components at mutually adjacent and opposite interfaces respectively of an outboard end of a wing 9 and an inboard end of a wing tip device 6 of a wing assembly 3 will now be described, referring to FIGS. 12 through 14. The wing assembly 3 of FIGS. 12 through 14 may, for example, be a left hand one (as viewed looking forwards along the fuselage 2) of the wing assemblies 3 shown in FIG. 1, and has similar features to the right hand wing assemblies 3 and 3a described herein with reference to FIGS. 2 through 6 and 7 through 11. Identical reference numerals will be used herein regardless of whether a feature is shown in the context of a left hand wing assembly or a right hand wing assembly, it being understood that the skilled person will have no difficulties adapting such features for either wing assembly 3 mutatis mutandis.

Figure 12:
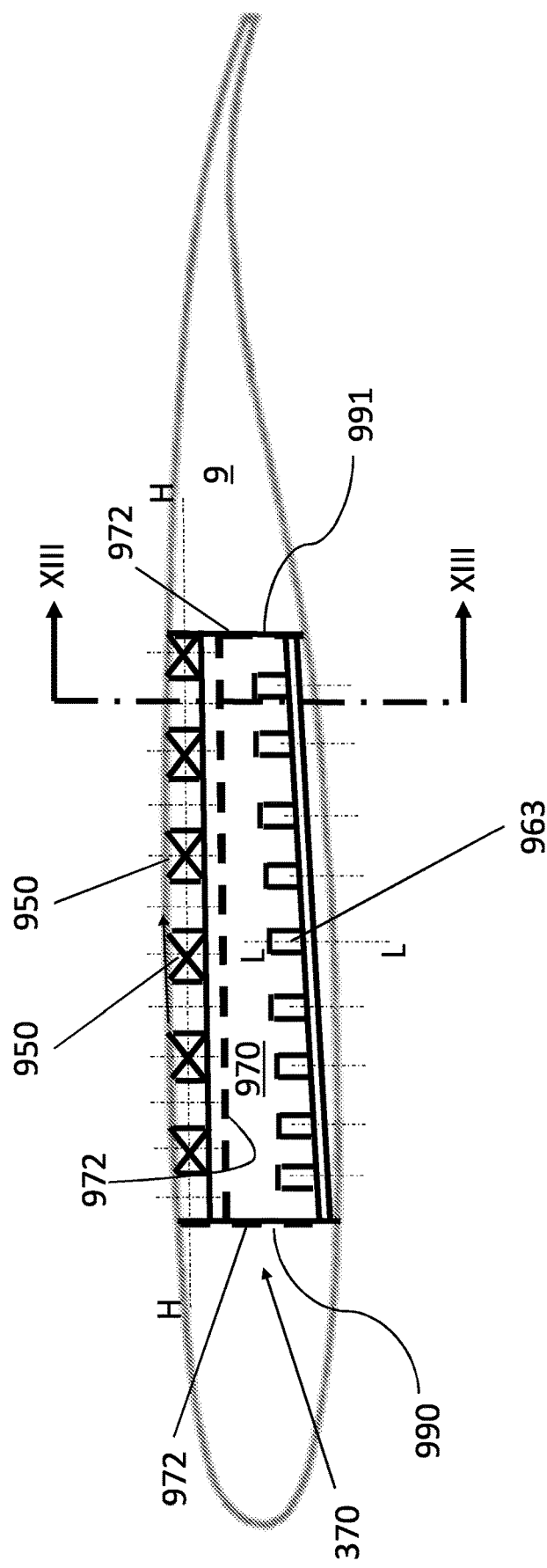
FIG. 12 is a view of portions of a wing of a wing assembly from a distal end.

FIG. 12 is a view of a portion of the left hand wing 9 from a distal end and facing inboard, omitting the wing tip device 6 and actuation assembly 200. FIGS. 13 and 14 show respective front views in cross section of portions of the wing 9 and wing tip device 6 (shown with broken lines) on a spanwise extending vertical plane XIII-XIII (FIG. 12) between a front spar 990 and a rear spar 991 of the wing 9. A plurality of mutually spaced hinge lugs 950, fixed relative to the wing 9 in a region of the upper cover of the wing 9, is arranged in sequence along a chordwise extending hinge axis H-H. A hinge shaft 951 is disposed in alignment with the axis H-H through openings in the hinge lugs 950. A plurality of mutually spaced counterpart hinge lugs 650 (FIGS. 13 and 14), fixed relative to the wing tip device 6 in a region of the upper cover of the wing tip device 6, are arranged in sequence along an axis, which coincides with the axis H-H in an assembled configuration of the wing assembly 3.

Figure 13:
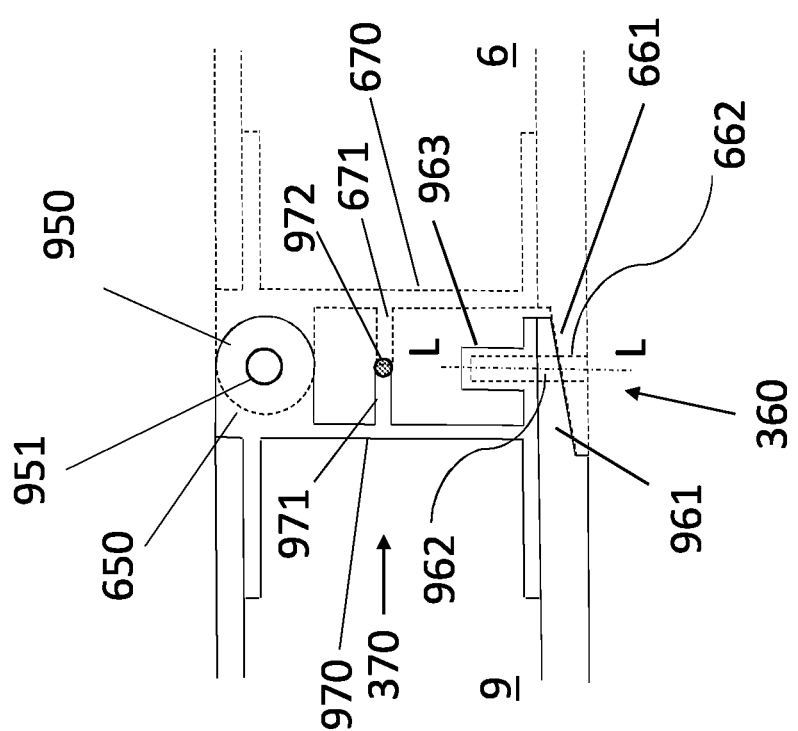
FIG. 13 is sectional front view of portions of the wing assembly of FIG. 12 with the wing tip device in the flight configuration.
Figure 14:
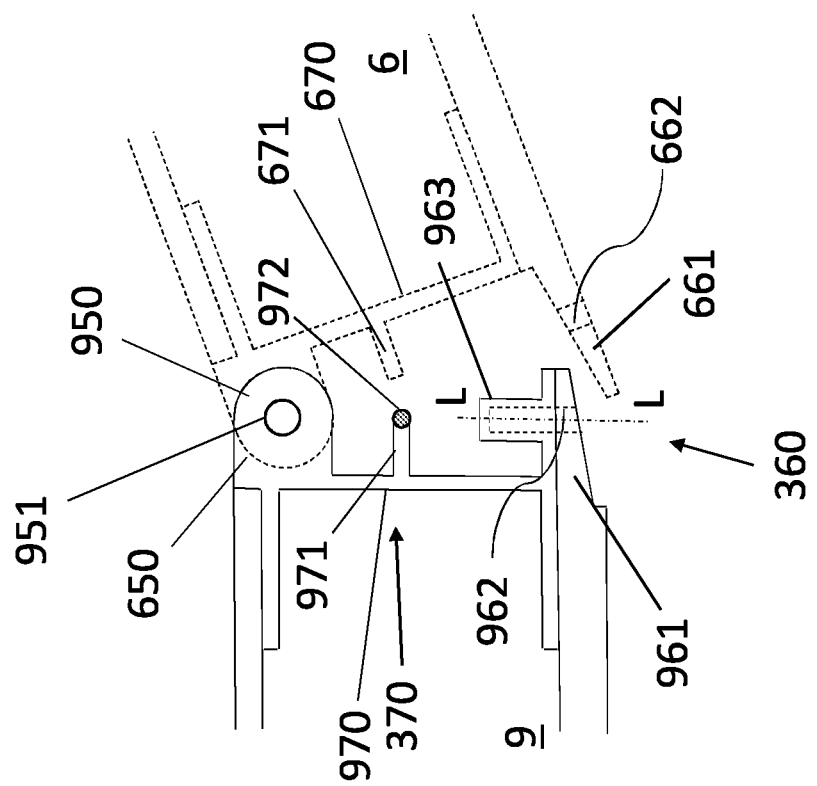
FIG. 14 is sectional front view of portions of the wing assembly of FIGS. 12 and 13 with the wing tip device moved out of the flight configuration.

In the assembled condition, the counterpart hinge lugs 650 of the wing tip device 6 are respectively disposed interleaved adjacent and/or between alternate respective hinge lugs 950 of the wing 9, and the hinge shaft 951 is disposed through openings in the hinge lugs 950 and counterpart hinge lugs 650 so as to pivotably interconnect the wing 9 and the wing tip device 6 for movement of the wing tip device 6 about the hinge axis H-H, as shown in FIG. 14. The hinge lugs 950 of the wing 9, the respective counterpart hinge lugs 650 and the hinge shaft 950 together form a sequence of hinge joints along the hinge axis H-H. The wing assembly 3 of FIGS. 12 through 14 has six hinge joints comprising six respective wing hinge lugs 950 (FIG. 12) and six respective counterpart wing tip device hinge lugs 650. However, in alternative embodiments, any suitable number of hinge joints may be provided.

The hinge joints 650, 950 are not interrupted by any part of the actuation assembly 200. Each hinge joint 650, 950 is disposed immediately adjacent to the or each neighboring hinge joint in the sequence. In alternative examples (not shown) a continuous hinge may be provided, or the hinge joints may be spaced apart, in each case also without interruption by the actuation assembly 200.

In some alternative examples (not shown), the sequence of hinge joints 650, 950 is interrupted by one or more upper latches provided adjacent and/or between the hinge joints 650, 950 for transferring flight loads, for example in the form of vertical or horizontal upper latch lugs disposed on the wing 9 adjacent and/or between respective hinge lugs 950, and counterpart vertical or horizontal counterpart upper latch lugs disposed on the wing tip device 6 adjacent and/or between respective counterpart hinge lugs 650, together with associated upper latch pins and upper latch pin actuators.

As shown in FIGS. 12 through 14, the wing assembly 3 is provided with lower latches 360 arranged in a chordwise sequence. The sequence of lower latches 360 is formed by a sequence of horizontal lower latch lugs 961 fixedly attached to the wing 9, and a sequence of counterpart horizontal lower latch lugs 661 fixedly attached to the wing tip device 6, together with associated respective lower latch pins (not shown) and lower latch pin actuators 963 for moving the latch pins axially along respective vertically extending latch pin axes L-L.

FIG. 14 shows the wing assembly 3 with the wing tip device 6 rotated to a position between the ground configuration and the flight configuration. It will be seen that as the wing tip device 6 is rotated into the flight configuration, the lower latch lugs 961 and counterpart lower latch lugs 661 will engage and become vertically adjacent one another. In the flight configuration, respective through holes 962 in the lower latch lugs 961 are aligned with respective through holes 662 in the counterpart lower latch lugs 661, and respective lower latch pins (not shown) are driven into the respective through holes 662 by the respective actuators 963 to securely latch and/or lock the sequence of lower latches 360. The lower latch pin actuators 963 include a locking mechanism (not shown). In this manner, the wing 9 and the wing tip device 6 are interconnected by the lower latches 360 for the transfer of flight loads between the wing 9 and the wing tip device 6. The wing assembly 3 of FIGS. 12 through 14 has nine lower latches 360, each comprising a respective lower latch pin actuator 963 (FIG. 12), lower latch pin, lower wing latch lug 961 and lower wing tip device latch lug 661. However, in alternative embodiments, any suitable number of lower latches 360 may be provided.

The sequence of lower latches 360 is disposed at, or in the region of, the lower covers of the wing assembly 3. For example, the lower latch lugs 961, 661 may be formed as extensions of the lower covers of the wing 9 and the wing tip device 6 respectively. In alternative embodiments, the lower latch pin actuators 963 and/or lower latch pins may be at least partially disposed outside of the wing assembly 3 so that the lower latch pins engage the lower latch lugs from below. Additionally or alternatively, the lower latch pin actuators 963 and/or lower latch pins may be affixed to the wing tip device 6. In some embodiments, multiple lower latch pins may be actuated by a single lower latch pin actuator. In alternative embodiments (not shown) separate latch pin locking mechanisms are provided, and/or at least some of the lower latch lugs 961 and counterpart lower latch lugs 661 may be vertical lugs, requiring horizontally orientated latch pins.

It is important for the effective reaction of flight loads about a chordwise axis that the hinge axis H-H and the sequence of lower latches 360 are spaced as far apart as the wing box depth and other design considerations allow. The presently described embodiment facilitates an increase in such spacing, in that the actuation assembly 200 does not unduly constrain the size or disposition of the lower latches

360. Importantly, the sequence of lower latches 360 is not interrupted by any part of the actuation assembly 200. Thus, the lower latches 360 can be disposed along a greater chordwise extent of the lower covers of the wing 9 and the wing tip device 6, thereby distributing transferred flight loads to a greater extent, and facilitating the avoidance of load concentrations at the lower covers. In the embodiments described above, the connector arrangement 210, 220 and the actuator 201 are disposed wholly externally of the lower covers of the wing 9 and of the wing tip device 6 in the flight configuration. In its broadest scope, the disclosure herein embraces wing assemblies 3 wherein the first connector member 210 of the connector arrangement is connected at the actuator 201 externally of the wing 9 and the wing tip device 6, regardless of whether some portion of the actuation assembly 200 encroaches within the design envelope of the wing 9 and/or of the wing tip device 6, for example within the bounds of the covers. The disclosure herein also embraces wing assemblies 3 wherein at least one of the connector arrangement 210, 220 and the actuator 201 are disposed wholly externally of the covers of the wing 9 and the wing tip device 6. Furthermore, wing assemblies wherein the actuation assembly 200 is disposed above the upper covers of the wing 9 and the wing tip device 6 are also contemplated by the disclosure herein.

A fairing (not shown) is provided about the actuation assembly 200 to reduce aerodynamic inefficiencies caused by protrusion of the actuation assembly 200 beneath the wing assembly. The fairing can conveniently be attached to moving parts of the actuation assembly, such as the first connector member and/or segments of the actuator 201, so as to be movably driven by the actuation assembly 200 as the wing assembly 3 moves in and out of the ground configuration.

Referring to FIGS. 12 through 14, the wing assembly 9 further comprises a seal arrangement 370 for resisting passage of air through an interface region between the wing 9 and the wing tip device 6. The seal arrangement 370 comprises a first seal support 970, including a vertically extending plate formed in this example by the primary outboard rib structure of the wing 9. The first seal support 970 provides a first seal support surface facing in a spanwise and outboard direction, and extends chordwise along the chordwise extent of the distal outboard end of the wing 9 between the front and rear spars 990 and 991 of the wing 9. Suitable supporting structure is provided for supporting the first seal support 970 in fixed relation to the wing 9. Air flowing across a lower surface of the wing assembly 3 cannot pass, or cannot pass in significant amounts thereof, inboard of and behind (to the left of, as shown in FIGS. 13 and 14) the first seal support 970 and into the region delimited by the front and rear spars 990, 991 and the upper and lower covers of the wing 9. As shown in FIGS. 13 and 14, at its upper and lower regions the first seal support 970 has rigid flanges extending inboard thereof and fixed to inwardly facing surfaces of the upper and lower covers using any appropriate form of joint to mitigate the passage of air between the flanges and covers. Furthermore, at its front and rear regions the first seal support 970 has rigid flanges (not shown) or other structure extending inboard thereof and fixed to inwardly directed faces of the front and rear spars 990, 991 using any appropriate form of joint to mitigate the passage of air between the flanges and the spars.

The seal arrangement 370 further comprises a second seal support 670, including a vertically extending plate formed in this example by the primary inboard rib structure of the wing tip device 6. The second seal support 670 provides a second seal support surface facing in a spanwise and inboard direction, and extends chordwise along the chordwise extent of the inboard end of the wing tip device 6 between front and rear spars of the wing 9. Suitable supporting structure is provided for supporting the second seal support 670 in fixed relation to the wing tip device 6. Air flowing across a lower surface of the wing assembly 3 cannot pass, or cannot pass in significant amounts thereof, inboard of and behind (to the right of, as shown in FIGS. 13 and 14) the second seal support 670 into the region delimited by the front and rear spars and the upper and lower covers of the wing tip device 6. As shown in FIGS. 13 and 14, at its upper and lower regions the second seal support 670 has rigid flanges extending internally of the wing tip device 6 and fixed to inwardly facing surfaces of the upper and lower covers of the wing tip device 6 using any appropriate form of joint to mitigate the passage of air between the flanges and covers. Furthermore, at its front and rear regions the second seal support 670 has rigid flanges (not shown) or other structure extending inboard thereof and fixed to inwardly directed faces of the front and rear spars of the wing tip device 6 using any appropriate form of joint to mitigate the passage of air between the flanges and the spars.

The first seal support 970 includes a flange 971 extending horizontally in a spanwise outboard direction from the vertically extending plate of the first seal support 970. An end face of the flange 971 provides the first seal support surface, which faces in a spanwise and outboard direction and extends between the front and rear spars 990 and 991. The first seal support surface supports a seal member 972 affixed thereto. The seal member 972 is resiliently compressible. The first seal support 970 also includes additional respective flanges at its front and rear regions, each of the additional flanges extending vertically between the upper and lower covers of the wing 9 in a spanwise outboard direction from the vertically extending plate of the first seal support 970. End faces of the additional flanges, which face in a spanwise and outboard direction and extend fully between the upper and lower covers of the wing 9, provide respective vertically extending extensions of the first seal support surface.

The second seal support 670 includes a flange 671 extending horizontally in a spanwise inboard direction from the vertically extending plate of the second seal support 670, an end face of the flange 671 providing the second seal support surface, which faces in a spanwise and inboard direction and extends fully between the front and rear spars of the wing tip device 6. The second seal support 670 also includes additional respective flanges at its front and rear regions, each of the additional flanges extending vertically between the upper and lower covers of the wing tip device 6 in a spanwise inboard direction from the vertically extending plate of the second seal support 670. End faces of the additional flanges, which face in a spanwise and inboard direction and extend fully between the upper and lower covers of the wing tip device 6, provide respective vertically extending extensions of the second seal support surface.

The compressible seal member 972 is disposed along the first seal support surface of the first seal support 970, and extends continuously chordwise along this surface between the front and rear spars 990 and 991. At the front and rear regions of the first seal support 970, the compressible seal member 972 further continues in a vertically downwardly extending direction, and optionally also in an upwardly extending direction, as indicated using broken lines in FIG. 12, along the end faces of the additional flanges. In other embodiments, the compressible seal member is, additionally or alternatively, disposed along the inboard facing second seal support surface of the second seal support 670, and/or may not be continuous.

It will be apparent that in the final stages of movement of the wing tip device 6 into the flight configuration, the respective first and second seal support surfaces mutually interact to cause compression of the seal member 972 therebetween, to provide an aerodynamic seal extending chordwise within the wing assembly 3, for resisting passage of air in flight from the high pressure region below the wing assembly 3 to the low pressure region above the wing assembly 3 through the interface region between the respective ends of the wing 9 and the wing tip device 6, the flanges 671, 971 acting as baffles to such passage of air. Movement of the wing tip device 6 out of the flight configuration allows decompression of the seal member. Making and breaking the aerodynamic seal of the wing assembly in this manner, with the seal support surfaces each directed normally, or close to normal, to the direction of engagement or disengagement, facilitates the reduction of seal breakout forces and a reduced likelihood of damage to the seal or the wing assembly 3. Advantageously, additional known sealing arrangements can be provided in the regions of the leading and/or trailing edges, and of the upper and/or lower covers, to complement the seal arrangement 370 described above.

Movement of the wing tip device 6 between the flight configuration and the ground configuration will now be described with reference to FIGS. 2 to 6. In the flight configuration shown in FIGS. 2 and 3 the lower latches 360 are engaged and locked, the seal arrangement 370 is in the sealed condition, and the leading and trailing edges 7, 8 of the wing 9 are in alignment with the leading and trailing edges 7', 8' respectively of the wing tip device 6. To initiate movement towards the ground configuration, the lower latch pin actuators 963 cause the lower latch pins (not shown) to move out of the openings in at least one set of the lower latch lugs 661, 961 thereby releasing the lower latches 360.

The actuator 201 is engaged so as to cause rotation of segments of the actuator 201 relative to the actuator body 202 in an anticlockwise direction as viewed in FIGS. 2 through 6. The actuator segments are fixed for rotation with respective first connector members 210, and cause the second end portions 212 of the first connector members 210 to apply force in an upward and outboard direction to the wing tip device 6 through the pivot mounts 610. The actuator body 202 in turn rotates relative to the segments in a clockwise direction as viewed in FIGS. 2 through 6, and causes the second end portions 222 of the second connector members 222 to apply force in an upward and inboard direction to the wing 9 through the pivot mounts 920. Because the wing 9 is not moveable by the actuator 201, the equal and opposite force exerted by the wing 9 on the actuator body 202 through the second connector member 220 causes the actuator to move in an upwards and outboard direction while the force applied through the second end portions 212 of first connector members 210 causes rotation of the wing tip device 6 about the hinge axis H-H in a clockwise direction.

Figure 5:
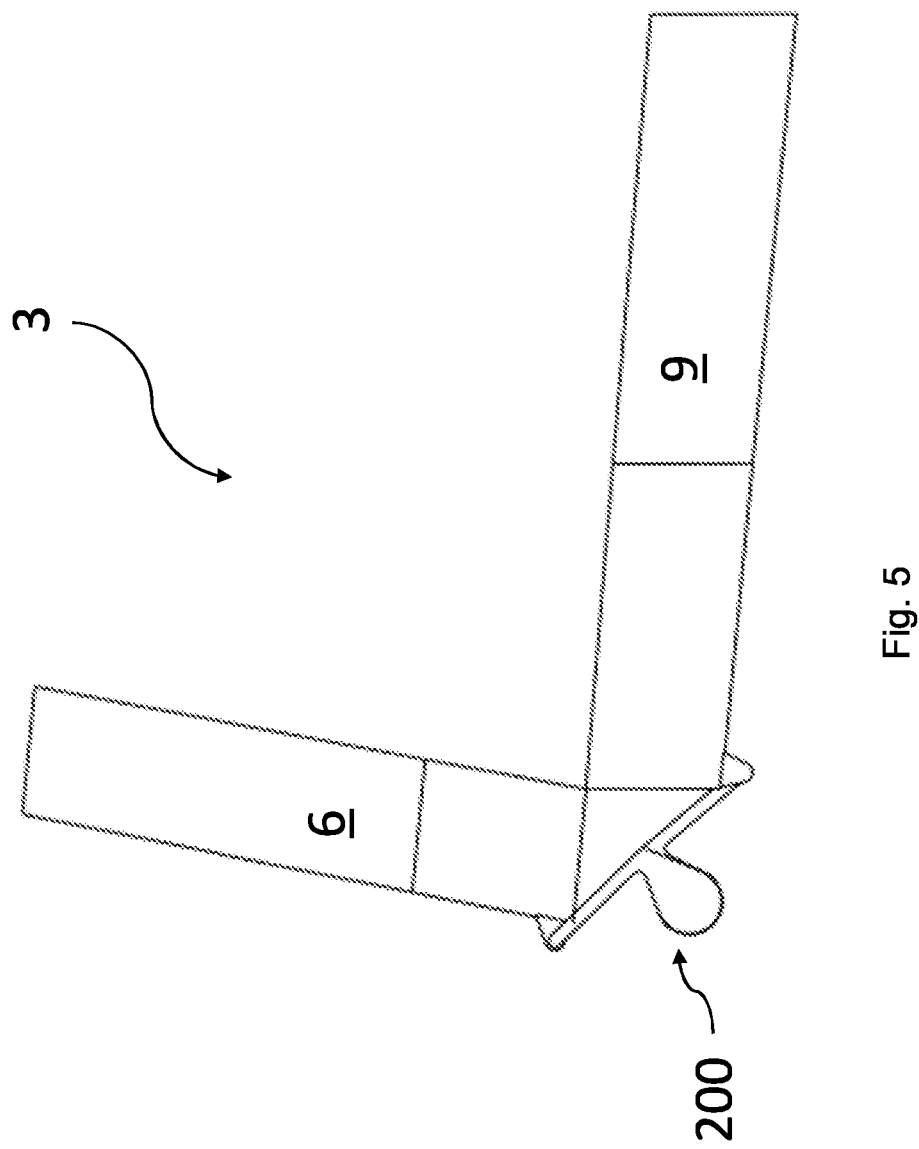
FIG. 5 is a front view of the wing assembly in a ground configuration.
Figure 6:
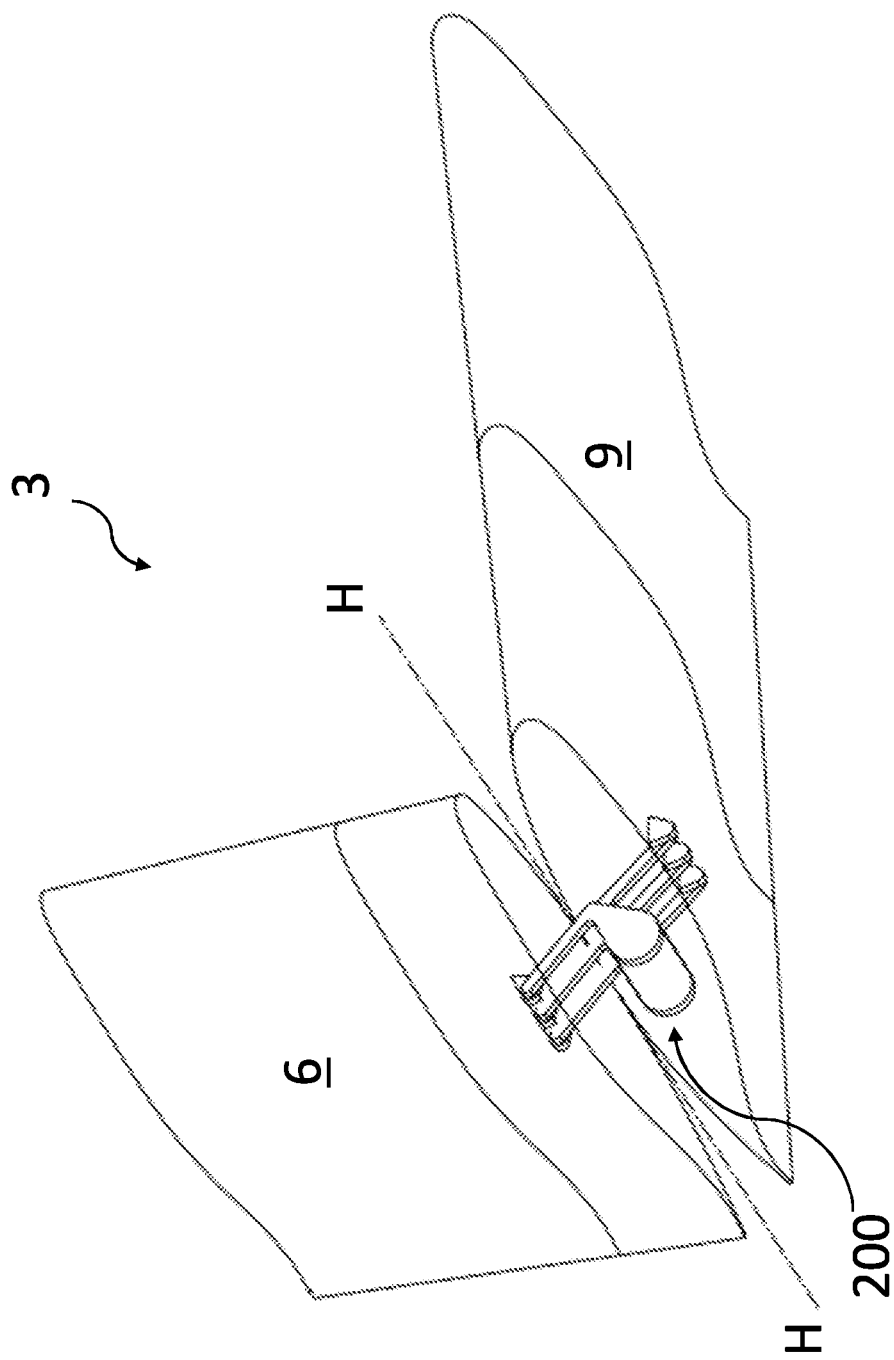
FIG. 6 is a perspective view of the wing assembly in the ground configuration.

FIG. 4 shows the wing tip device 6 rotated into an intermediate configuration, and FIGS. 5 and 6 show the wing assembly 3 in a ground configuration. In the ground configuration, the distal end of the wing tip device 6 lies fully inboard of the wing assembly 3, and the actuator assembly 200 has been moved upwards, thereby increasing ground clearance of the wing assembly 3. In some embodiments, an additional locking mechanism (not shown) is provided, for securing and supporting the wing tip device 6 in the ground configuration, to reduce or remove from the actuator loads experienced by the wing tip device 6 in the ground configuration.

To move back to the flight configuration, any additional locking mechanism is released, and the movements and actions above are reversed to bring the wing tip device 6 to the flight configuration.

FIGS. 7 through 11 illustrate a wing assembly 3a, identical with the wing assembly 3 except for the provision of an alternative actuator assembly 700 in place of the actuator assembly 200. Where features of the alternative wing assembly 3a are identical to features described above with reference to FIGS. 1 through 6 and 12 through 14, identical reference numerals will be used in and with reference to FIGS. 7 through 11.

Figure 7:
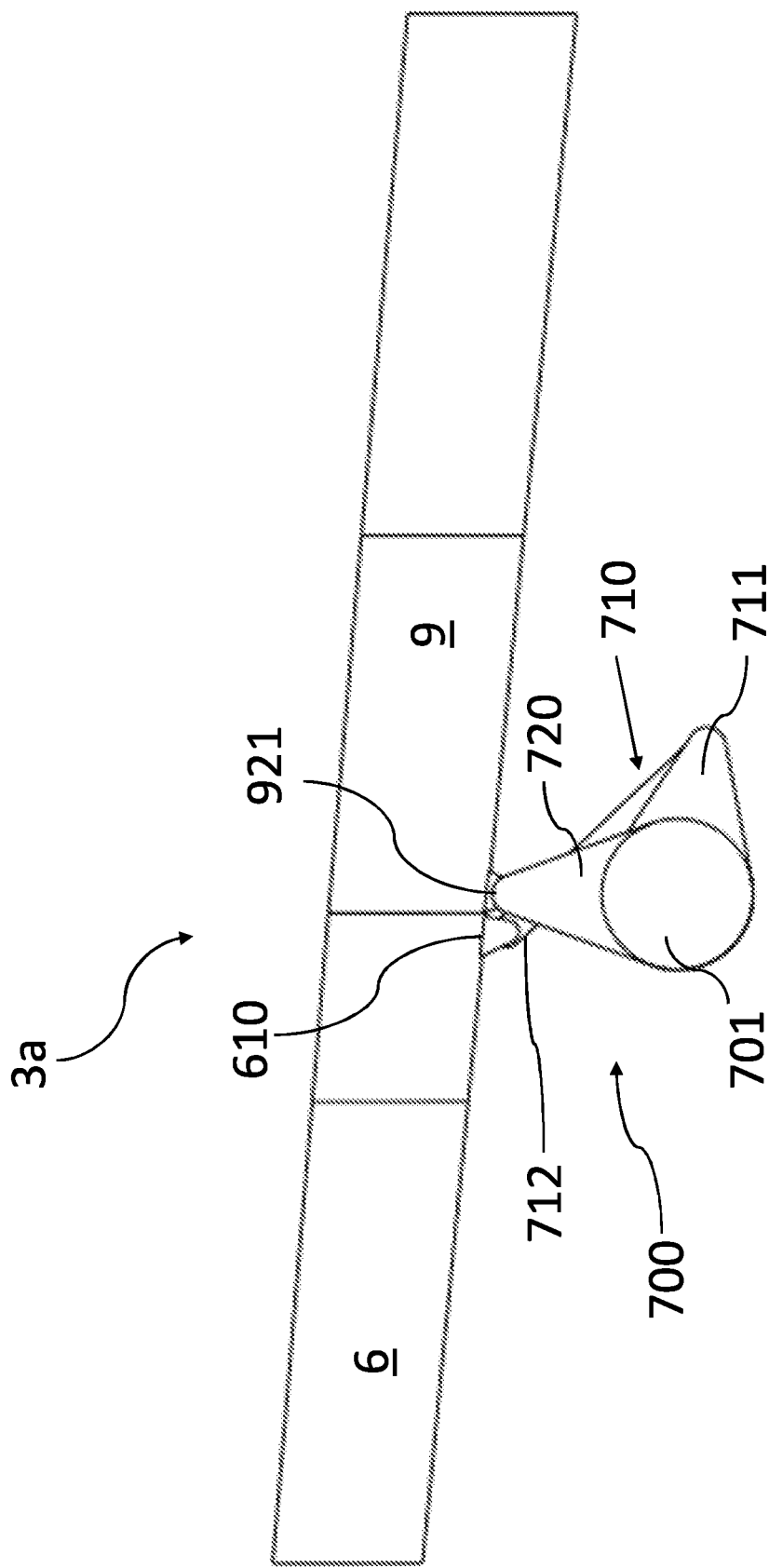
FIG. 7 is a front view of portions of an alternative wing assembly in a flight configuration.
Figure 8:
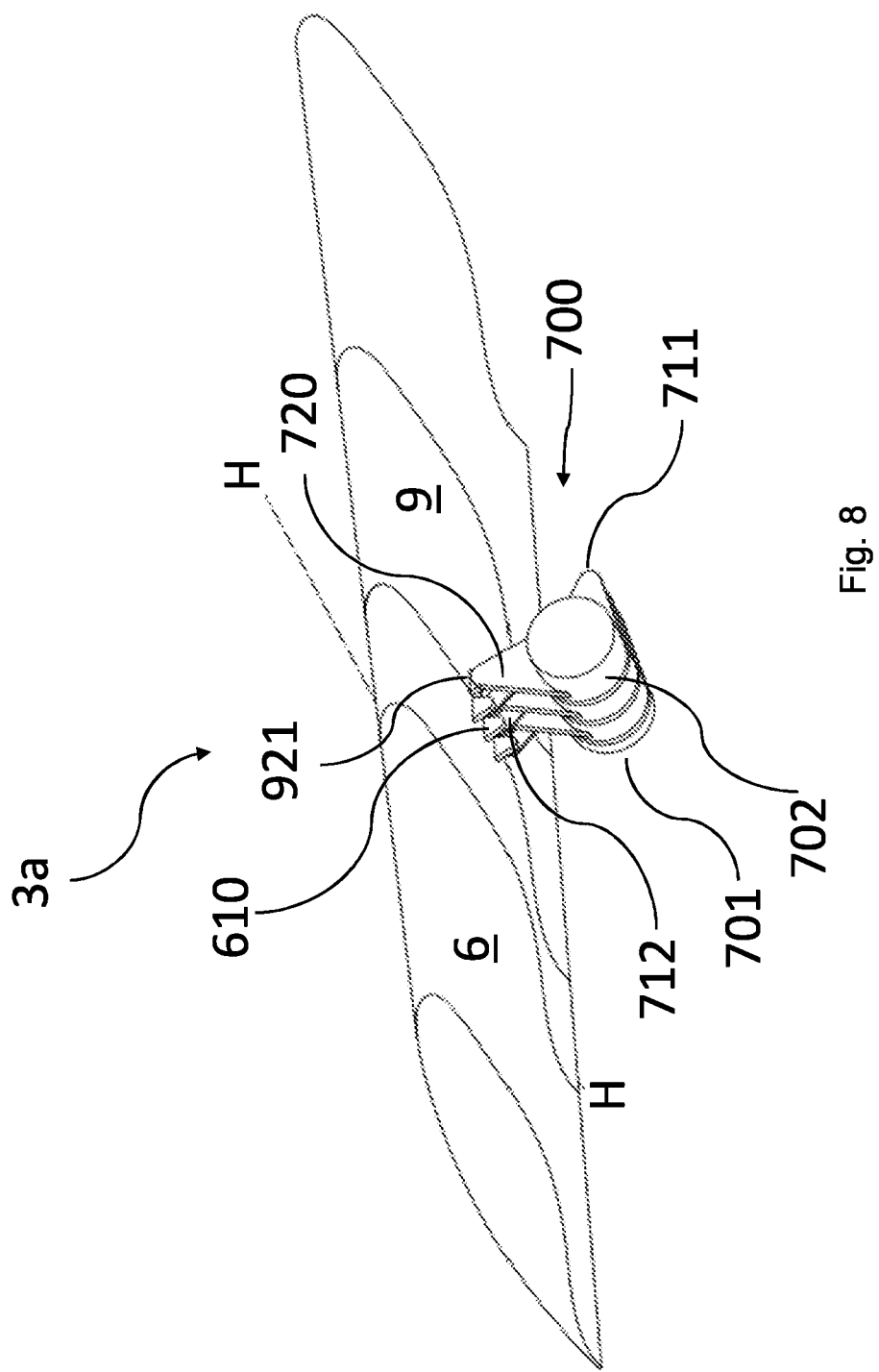
FIG. 8 is a perspective view of the alternative wing assembly in the flight configuration.

FIG. 7 is a schematic front view of the wing assembly 3a in the flight configuration. FIG. 8 is a perspective view of the wing assembly 3a of FIG. 7 from below and in a spanwise and inboard direction. The actuation assembly 700 comprises at least one actuator 701, which in the example is a rotary actuator, and a connector arrangement connecting the actuator 701 to the wing assembly 3a for driving movement of the wing tip device 6 relative to the wing 9.

The connector arrangement comprises a first connector member 710 having a first portion 711 thereof connected at the actuator 701 and a second portion 712 thereof pivotably connected at a lower portion of the wing tip 6. In the example shown in FIGS. 7 through 11, the first connector member 710 comprises a first portion 711 fixedly mounted relative to a segment of the actuator 701. The segment is rotatably drivable by the actuator about an axis of rotation of the actuator 701 relative to a rigid body portion 702 of the actuator 701. The second portion 712 of the first connector member 710 is pivotably connected to the first portion 711, and is pivotably mounted to a pivot mount 710 fixed relative to the lower cover of the wing tip device 6. To move to a ground configuration, the first portion 711 is driven about the axis of rotation of the actuator 701 in an anti-clockwise direction as shown in FIGS. 7 through 11, and imparts force to the second portion 712 though the first portion's pivot connection with the second portion 712, which in turn imparts force to the lower cover of the wing tip device 6 in a direction having an upward component and an outboard component.

The connector arrangement further comprises a rigid second connector member 720 interconnected between the actuator 701 and the wing 9. A first portion of the second connector member 720 is fixedly connected at the actuator 701 to the actuator body 702 and a second portion of the second connector member 720 is fixedly connected at a lower portion of the wing 9, so as to fix the actuator 701 relative to the wing assembly 3.

In the embodiment shown in FIGS. 7 through 11, the connector arrangement comprises a chordwise extending sequence of three first connector members 710 interconnecting respective rotatably drivable segments of the actuator 701 and respective pivot mounts 610 of the wing tip device 6. The first connector members 710 are interleaved with a corresponding chordwise extending sequence of three second connector members 720 respectively interconnecting the actuator body 702 and respective mounts 921 of the wing 9. In alternative embodiments, the connector arrangement may comprise any suitable alternative number of first and/or second connector members 710, 720, according to design requirements. The wing assembly 3a may comprise more than one actuator assembly 700.

Movement of the wing tip device 6 of the wing assembly 3a between the flight configuration and the ground configuration will now be described with reference to FIGS. 7 through 14. In the flight configuration shown in FIGS. 7 and 8 the lower latches 360 are engaged and locked, the seal arrangement 370 is in the sealed condition, and the leading and trailing edges 7, 8 of the wing 9 are in alignment with the leading and trailing edges 7', 8' respectively of the wing tip device 6. To initiate movement towards the ground configuration, the lower latch pin actuators 963 cause the lower latch pins (not shown) to move out of the openings in at least one set of the lower latch lugs 661, 961 thereby releasing the lower latches 360.

The actuator 701 is engaged so as to cause rotation of segments of the actuator 701 relative to the actuator body 702 in an anticlockwise direction as viewed in FIGS. 7 through 11. The actuator segments are fixed for rotation with respective first connector members 710, and cause the second end portions 712 of the first connector members 710 to apply force in an upward and outboard direction to the wing tip device 6 through the pivot mounts 610, thereby causing rotation of the wing tip device 6 about the hinge axis H-H in a clockwise direction.

Figure 9:
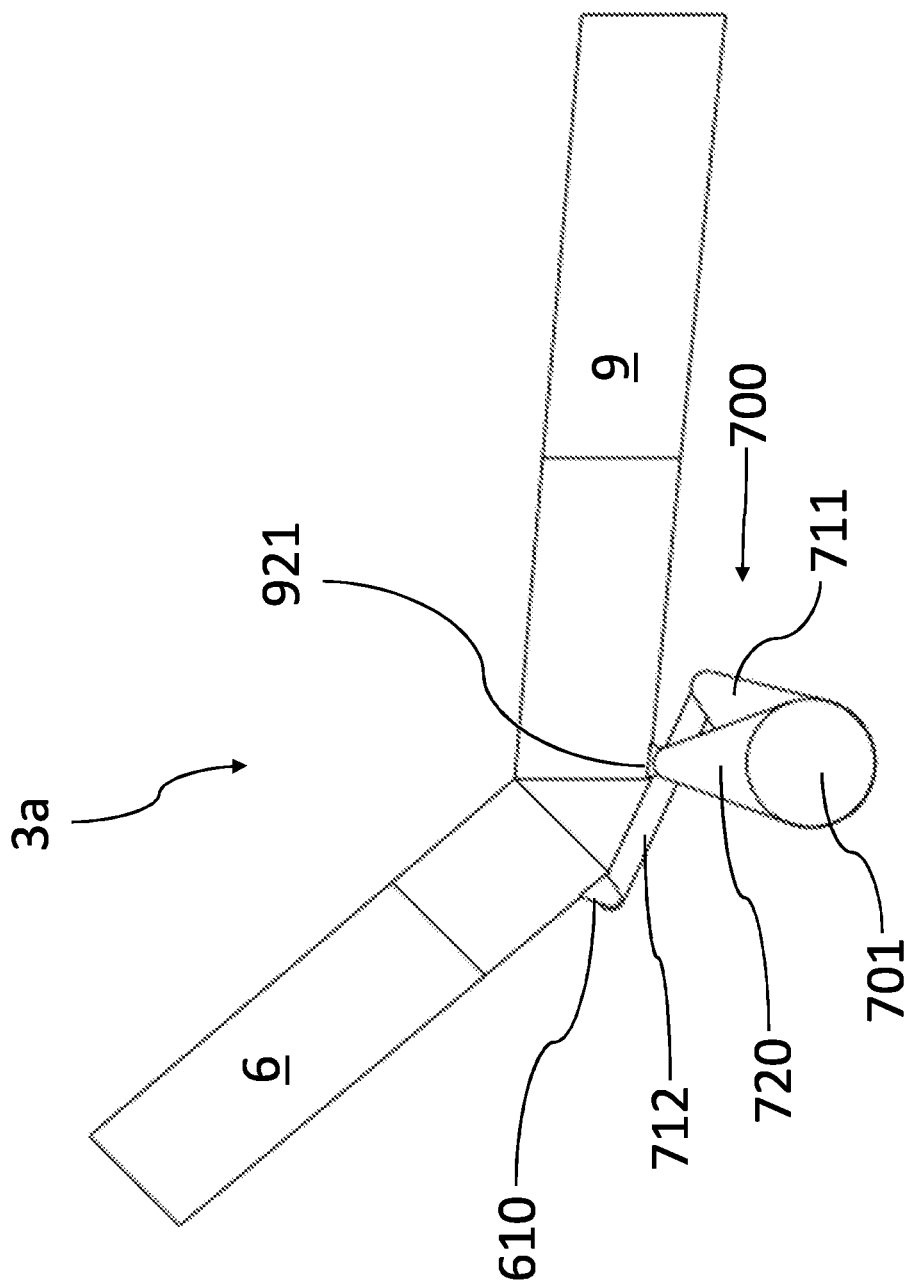
FIG. 9 is a front view of the alternative wing assembly in an intermediate configuration.
Figure 10:
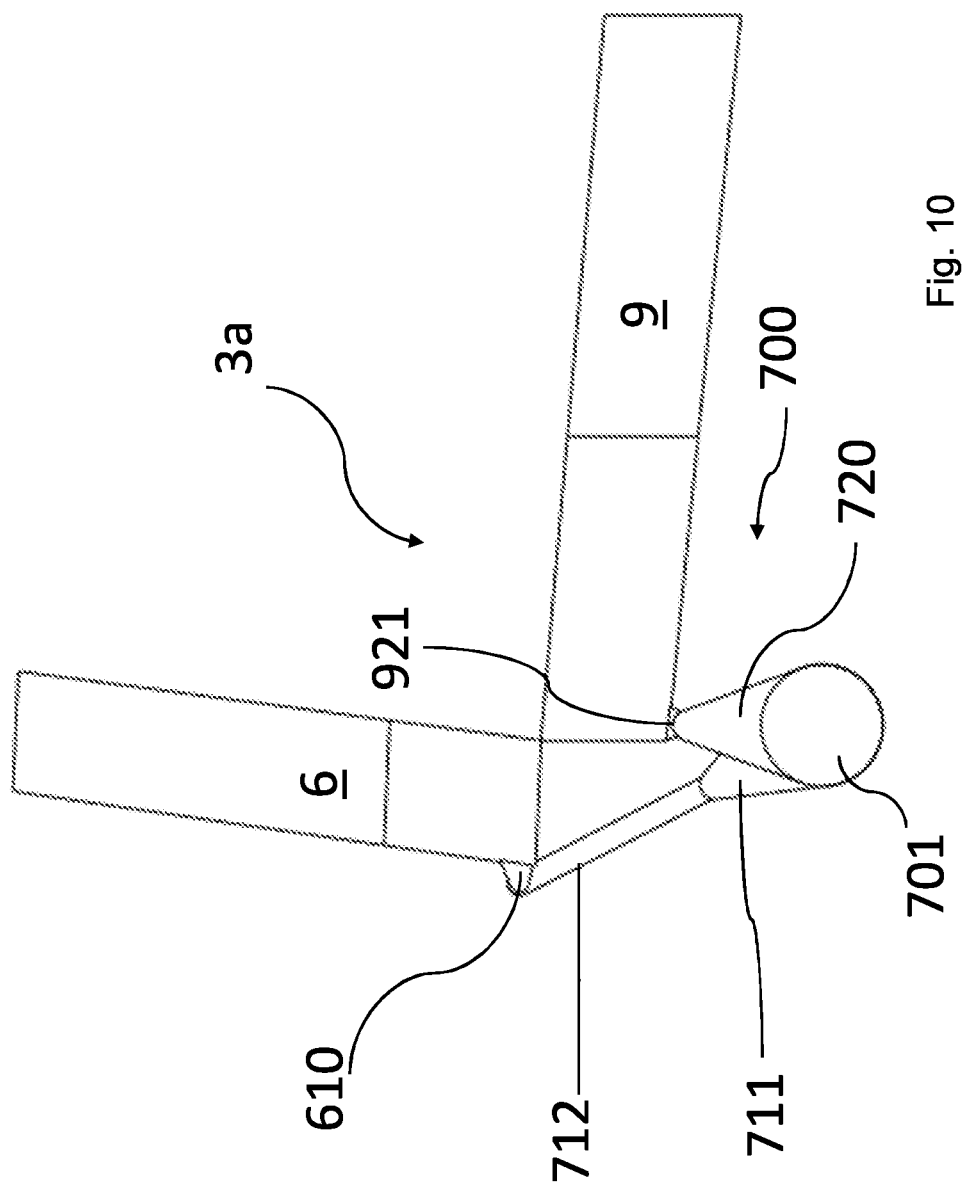
FIG. 10 is a front view of the alternative wing assembly in a ground configuration.
Figure 11:
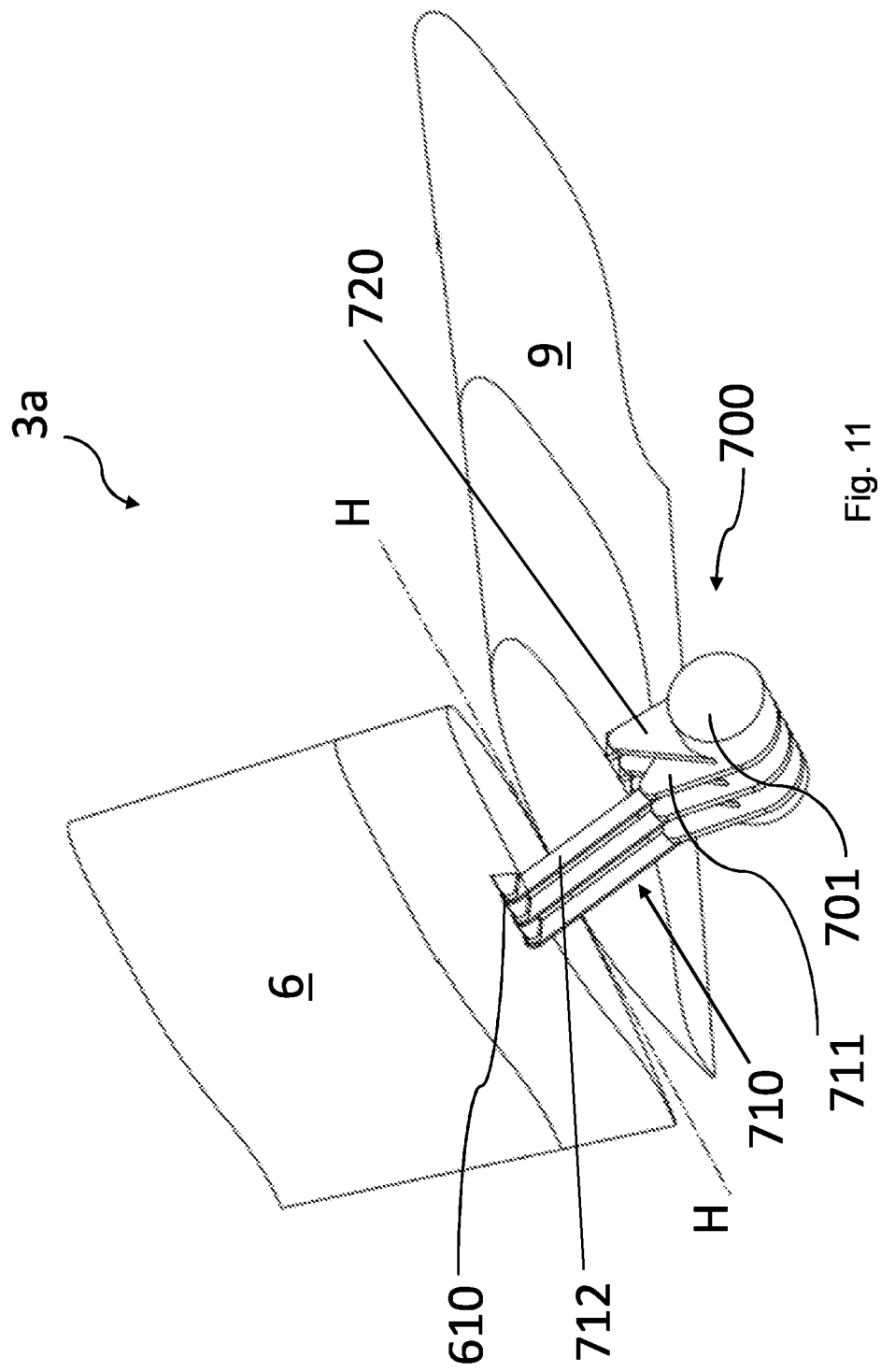
FIG. 11 is a perspective view of the alternative wing assembly in the ground configuration.

FIG. 9 shows the wing tip device 6 rotated into an intermediate configuration, and FIGS. 10 and 11 show the wing assembly 3a in a ground configuration. In the ground configuration, the distal end of the wing tip device 6 lies fully inboard of the wing assembly 3a. In some embodiments, an additional locking mechanism (not shown) is provided, for securing and supporting the wing tip device 6 in the ground configuration, to reduce or remove from the actuator loads experienced by the wing tip device 6 in the ground configuration. To move back to the flight configuration, any additional locking mechanism is released, and the movements and actions above are reversed to bring the wing tip device 6 to the flight configuration.

The actuators 201, 701 may take any of a wide variety of forms and may for example be any suitable kind of gas, hydraulic or electric drive. Alternative implementations of the actuator assemblies 200, 700 will be apparent to the ordinarily skilled person, including the use of linear actuators to provide rotary movement, and/or various alternative mechanical linkages to provide the connector arrangement.

Vertical or vertically as used herein does not have a strict geometrical meaning, but relates to any movement or direction having a major component generally perpendicular to a chord of the wing, and generally parallel to the ribs of the wing 9. Chordwise as used herein does not have a strict literal meaning, but relates to any movement or direction having a major component generally parallel to a chord of the wing, and for example encompasses movements or directions angled relative to the chord by up to about 10-15 degrees, and/or lying generally transverse to a flexural axis of the wing. Spanwise as used herein does not have a strict literal meaning, but relates to any movement or direction having a major component extending along the wing assembly generally perpendicular to a chord of the wing and/or plane of the ribs of the wing 9, and for example encompasses movements or directions angled from the perpendicular to the chord by up to about 10-15 degrees, and/or lying generally parallel to a flexural axis of the wing.

While the disclosure herein has been described and illustrated with reference to particular embodiments, it will be appreciated by those of ordinary skill in the art that the disclosure herein lends itself to many different variations not specifically illustrated herein. By way of example the wing tip device need not necessarily be of the shape shown in the drawings but could be of many other shapes. Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

It should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing assembly for an aircraft, the wing assembly comprising:
   a wing;
   a moveable wing tip device at a tip of the wing; and
   an actuation assembly configured to move the wing tip device between:
      a flight configuration for use during flight, in which the wing tip device projects from the wing for increasing a span of the aircraft; and
      a ground configuration for use during ground-based operations, in which the wing tip device is moved away from the flight configuration for reducing the span of the aircraft;
   wherein the actuation assembly comprises:
      an actuator; and
      a connector arrangement that connects the actuator to the wing assembly for driving movement of the wing tip device relative to the wing; and
   wherein the actuation assembly is disposed wholly externally of lower covers of the wing and of the wing tip device in the flight configuration.

2. The wing assembly according to claim 1, wherein the connector arrangement comprises:
   a first connector member having a first portion pivotably connected at the actuator;
   a second portion pivotably connected at a lower portion of the wing or the wing tip device; and
   a second connector member interconnected between the actuator and another of the wing or the wing tip device.

3. The wing assembly according to claim 2, wherein the second connector member comprises:
   a first portion that is fixedly connected at a body of the actuator; and
   a second portion that is pivotably connected at a lower portion of another of the wing or the wing tip device.

4. The wing assembly according to claim 2, wherein the second connector member comprises first and second portions that are, respectively, fixedly connected at a body of the actuator and at another of the wing or the wing tip device.

5. The wing assembly according to claim 1, comprising hinge joints in a chordwise sequence along a hinge axis, wherein the hinge joints pivotably interconnect the wing and the wing tip device, and wherein the sequence of the hinge joints is not interrupted by the actuation assembly.

6. The wing assembly according to claim 5, wherein each of the hinge joints is immediately adjacent to a neighboring one of the hinge joints in the sequence of the hinge joints.

7. The wing assembly according to claim 5, wherein the sequence of the hinge joints is interrupted by at least one upper latch mechanism for transferring flight load.

8. The wing assembly according to claim 1, comprising lower latches in a chordwise sequence, wherein, in the flight configuration, the lower latches are configured to interconnect the wing and the wing tip device for transfer of flight loads therebetween, and wherein the sequence of the lower latches is not interrupted by the actuation assembly.

9. The wing assembly according to claim 1, wherein the wing and the wing tip device each have respective seal support surfaces that mutually interact in the flight configuration to provide an aerodynamic seal extending chordwise within the wing assembly, for resisting passage of air through an interface region between the wing and the wing tip device.

10. The wing assembly according to claim 9, wherein the seal extends continuously between a front spar and a rear spar of the wing assembly.

11. The wing assembly according to claim 9, wherein the seal support surfaces interact in the flight configuration to compress a compressible seal member therebetween.

12. The wing assembly according to claim 1, wherein the actuator is a rotary actuator.

13. An aircraft comprising the wing assembly according to claim 1.

14. A wing assembly for an aircraft, the wing assembly comprising:
a wing;
a moveable wing tip device at a tip of the wing; and
an actuation assembly configured to move the wing tip device between:
a flight configuration for use during flight, in which the wing tip device projects from the wing for increasing a span of the aircraft; and
a ground configuration for use during ground-based operations, in which the wing tip device is moved away from the flight configuration for reducing the span of the aircraft;
wherein the actuation assembly comprises:
an actuator; and
a connector arrangement that connects the actuator to the wing assembly for driving movement of the wing tip device relative to the wing; and
wherein the connector arrangement comprises:
a first connector member that has:
a first portion that is connected externally of the wing and the wing tip device assembly at the actuator; and
a second portion that is pivotably connected at a lower portion of the wing or the wing tip device;
wherein the actuation assembly is disposed wholly externally of lower covers of the wing and of the wing tip device in the flight configuration.

15. The wing assembly according to claim 14, the connector arrangement comprising a second connector member having a first portion fixedly connected at a body of the actuator and a second portion pivotably connected at a lower portion of the other of the wing or the wing tip device.

16. The wing assembly according to claim 14, the connector arrangement comprising a second connector member having first and second portions respectively fixedly connected at the actuator body and another of the wing or the wing tip device.

17. The wing assembly according to claim 14, wherein the second portion of the first connector is pivotably connected at lower covers of the wing tip device.

18. An actuation assembly configured to move a moveable wing tip device of a wing assembly, the actuation assembly comprising:
an actuator; and
a connector arrangement configured for connecting the actuator to the wing assembly for driving movement of the wing tip device relative to a wing of the wing assembly;
wherein the connector arrangement comprises:
a first connector member that comprises:
a first portion that is pivotably connectable at the actuator externally of the wing assembly; and
a second portion that is pivotably connectable at a lower portion of the wing or the wing tip device, and
a second connector member that is interconnectable between the actuator and another of the wing or the wing tip device;
wherein the actuation assembly is disposed wholly externally of lower covers of the wing and of the wing tip device in the flight configuration.

19. The actuation assembly according to claim 18, wherein the second connector member comprises:
a first portion that is fixedly connectable at a body of the actuator; and
a second portion that is pivotably connectable at a lower portion of another of the wing or the wing tip device.

20. The actuation assembly according to claim 18, wherein the second connector member comprises first and second portions that are, respectively, fixedly connectable at a body of the actuator and at another of the wing or the wing tip device.

21. A wing assembly for an aircraft, the wing assembly comprising:
a wing;
a moveable wing tip device at a tip of the wing; and
an actuation assembly configured to move the wing tip device between:
a flight configuration for use during flight, in which the wing tip device projects from the wing for increasing a span of the aircraft; and
a ground configuration for use during ground-based operations, in which the wing tip device is moved away from the flight configuration for reducing the span of the aircraft;
wherein the wing and the wing tip device each have respective seal support surfaces that mutually interact in the flight configuration to provide an aerodynamic seal extending chordwise within the wing assembly, for resisting passage of air through an interface region between the wing and the wing tip device, the seal extending continuously between a front spar and a rear spar of the wing assembly; and wherein the actuation assembly is disposed wholly externally of lower covers of the wing and of the wing tip device in the flight configuration.

22. The wing assembly according to claim 21, wherein the seal support surfaces interact in the flight configuration to compress a compressible seal member therebetween.

* * * * *